G. G. WHITE.
TREADLE OPERATED DRIVING MECHANISM.
APPLICATION FILED NOV. 25, 1914.
1,141,026.
Patented May 25, 1915.
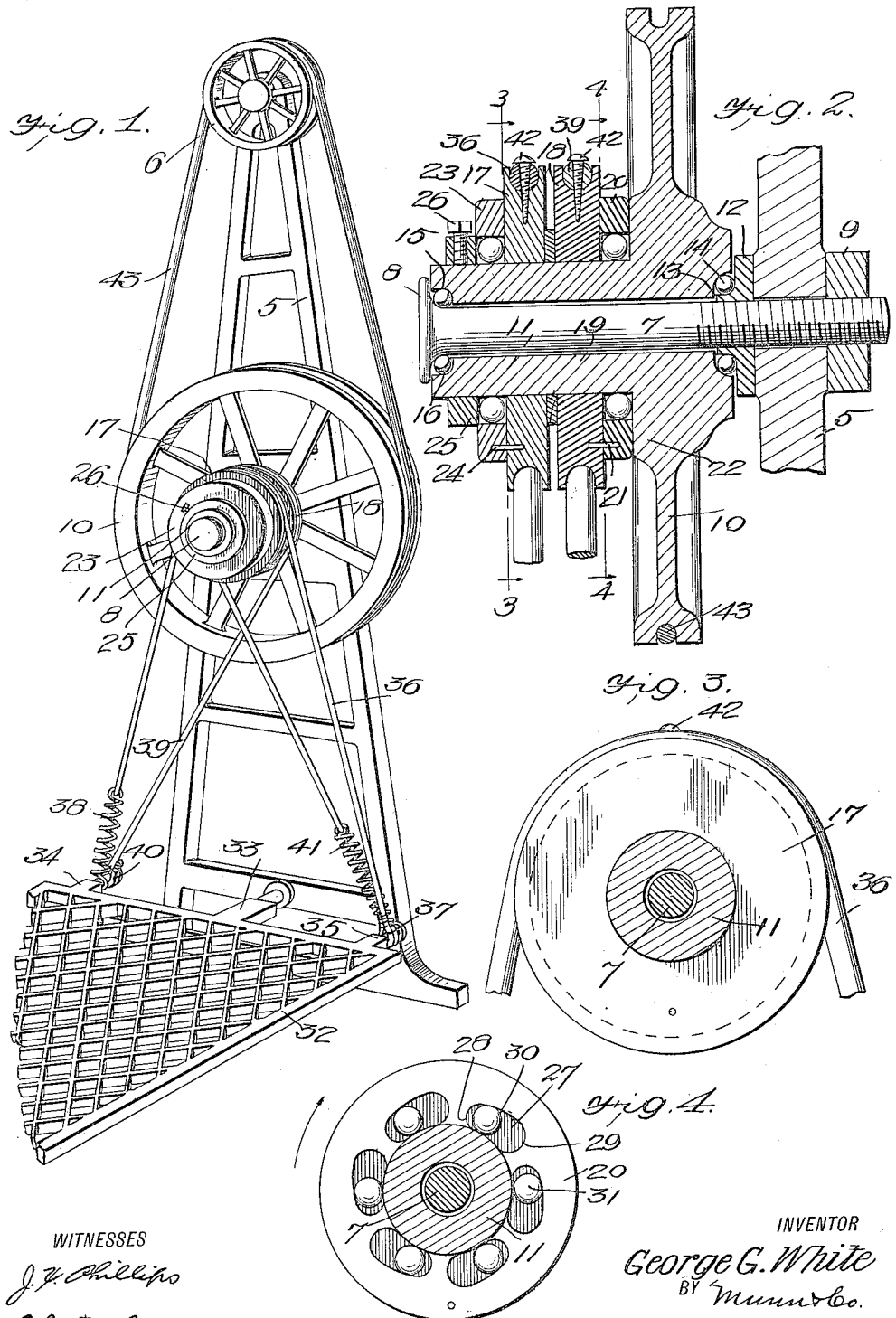
WITNESSES
INVENTOR
George G. White
BY Munn & Co.
ATTORNEYS

UNITED STATES PATENT OFFICE.

GEORGE GRANT WHITE, OF ST. JOSEPH, MISSOURI.

TREADLE-OPERATED DRIVING MECHANISM.

1,141,026.　　　　　Specification of Letters Patent.　　Patented May 25, 1915.

Application filed November 25, 1914.　Serial No. 873,848.

*To all whom it may concern:*

Be it known that I, GEORGE G. WHITE, a citizen of the United States, residing at St. Joseph, in the county of Buchanan and State of Missouri, have invented certain new and useful Improvements in Treadle-Operated Driving Mechanisms, of which the following is a specification.

This invention relates to an improvement in the operating mechanism of treadle driven machinery.

One of the principal objects of the invention is to provide an improved treadle driven motor or operating mechanism, providing means for preventing dead centering of the machinery, whereby the same may be started by foot, with the treadle in any position in its path of movement.

Another object of the invention is to provide an improved method of mounting the driving and fly wheels.

A further object is to provide an improved driving belt arrangement whereby rotation may be imparted to the fly wheel from any position of the treadle by merely exerting pressure upon the latter.

A still further object of the invention is to provide an improved device of the class specified which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a view in perspective of an improved device constructed according to my invention. Fig. 2 represents a transverse sectional view taken through the driving wheels and fly wheel. Fig. 3 represents a sectional view taken on the plane indicated by the line 3—3 of Fig. 2 looking in the direction indicated by the arrows. Fig. 4 represents a sectional view taken on the plane indicated by the line 4—4 of Fig. 2 looking in the direction indicated by the arrows.

In the drawing I have indicated a conventional frame at 5 and a band wheel or pulley 6 mounted upon the frame. The pulley 6 represents the portion of the machinery such as a lathe or grinding stone operable by the driving mechanism hereinafter described.

In carrying out my invention I provide a stub axle 7 having a headed end 8. The opposite end of the stub axle is threaded for the reception of a jam nut 9 for binding the axle in place upon the framework 5, through an opening in which said axle is adapted at its threaded end to be passed.

Rotatably mounted upon axle 7 is a grooved fly wheel 10, having a laterally extending integral sleeve 11. A cone bearing 12 is disposed upon the axle between the sleeve and frame 5, and the adjacent end of the sleeve is provided with an annular raceway 13. Between cone bearing 12 and raceway 13 a series of bearing balls 14 are disposed. Headed end 8 of the axle is also in the form of a cone bearing, and co-acts with an annular raceway 15 in the opposite end of the sleeve in receiving a series of bearing balls 16. In this manner an anti-friction bearing for the fly wheel and its sleeve is provided.

Rotatably positioned upon sleeve 11 are a pair of grooved drive wheels 17 and 18 respectively. They are separated by an annular washer or bearing plate 19 also rotatably positioned upon said sleeve. A ratchet disk 20, rotatably disposed on sleeve 11, is secured by means of dowel pins 21 to drive wheel 18, and occurs between said wheel and the hub 22 of fly wheel 10. A similar ratchet disk 23 is connected by means of dowel pins 24 to the outer face of drive wheel 17, and is likewise rotatably disposed upon sleeve 11. A retaining collar 25 is positioned on said sleeve adjacent disk 23, and may be maintained in adjusted position by means of a set screw 26.

Each disk 20, as indicated in Fig. 4, is provided adjacent its inner periphery with a series of transverse longitudinally tapered recesses 27 having concaved end walls 28 and 29. The floors 30 of the recesses incline from the larger concaved ends 29 toward the axis of the disk and merge with the smaller concaved ends 28 of the recesses. Opposite the floors 30, the recesses open upon the inner periphery of the disk. When the disk is disposed upon sleeve 11, the open sides of the recesses are closed by said sleeve. Disposed in each recess is a clutch ball 31. When the disk, as indicated in Fig. 4, is turned in the direction of the arrow, movement of the disk relatively to its contained clutch balls will bring the smaller ends of the recesses toward said balls until the latter are clamped between the floor 30 of the recesses and the sleeve 11. Thus the rotary motion of the disk is imparted to said sleeve, and when the disk is stopped or is moved in a reverse direction the sleeve 11 will carry the balls into the larger ends of the recesses and will thus unlock the disk from the sleeve whereby the rotary motion of said sleeve may continue unhampered. The disks 20 and 23 are mounted upon the sleeve so that they both move in the same direction to clutch the sleeve.

A treadle as indicated at 32, is centrally pivoted as at 33 upon frame 5. The treadle is provided on opposite sides of its pivot point with studs 34 and 35. A driving belt 36 is connected at one end 37 to stud 35, passes over drive wheel 17 and at its opposite end is joined by means of a spring 38 with the opposite stud 34. A second driving belt 39 passes around driving wheel 18, and is crossed beneath the same, one end of said belt being connected at 40 to stud 34 and at the opposite end being connected by means of a spring 41 with the opposite stud 35. By depressing the near end of the treadle as it appears in the drawing, belt 36 will by rotating its drive wheel 17, impart rotation to the fly wheel 10. By depressing the opposite end of the treadle the belt 39 will impart rotation in the same direction to drive wheel 18, and in turn the fly wheel 10. Thus by depressing either end of the treadle the fly wheel will be driven in the same direction. In this manner the dead center of the fly wheel is done away with, and furthermore the fly wheel may be started by merely depressing the treadle at either end, thus eliminating the hand starting of the fly wheel common to so many treadle operated motors. The springs 38 and 41 tend to maintain the drive belts taut upon their respective drive wheels. If so desired chains or other suitable flexible elements may be utilized in place of the belts, it being understood that the word "belts" as used in the claims indicates any suitable flexible driving elements.

In order to prevent slipping of belts 36 and 39 upon their respective drive wheels, they are connected each at a single point to said wheels, by means of screws or other suitable elements 42. A suitable belt or other element 43 passes around fly wheel 10 and pulley 6 whereby rotary motion may be transmitted to said pulley and the machine which it operates, by rotation of the fly wheel.

Although I have described the preferred embodiment of my invention, I may desire to make such changes in the construction, combination and arrangement of parts thereof as do not depart from the spirit of the invention and the scope of the appended claims.

I claim:—

1. A treadle operated mechanism including a frame, a stub axle projecting therefrom and having a headed end, a fly wheel rotatably disposed upon the axle and having an integral collar surrounding said axle, a bearing on the axle between the sleeve and frame, anti-friction bearings at the ends of the sleeve and disposed between the same and the headed axle end and bearing, a pair of drive wheels rotatably disposed upon said sleeve, a bearing plate rotatably disposed upon the sleeve and between the drive wheels, a ratchet disk secured to each drive wheel and surrounding the sleeve, clutch means between the ratchet wheels and sleeve for locking the former with the latter when the ratchet wheels are moved in one direction, a centrally pivoted treadle, and belts connected at their opposite ends to the treadle on opposite sides of the pivot point of the latter and engaging the driving wheels, whereby rotary motion may be imparted to the latter.

2. A device of the class described including a frame, a stub axle removably carried thereby and having a headed end, means for removably securing the stub axle to the frame, a sleeve rotatably surrounding the axle and provided with a fly wheel, a bearing provided on the axle and disposed between the sleeve and frame, anti-friction means at the ends of the sleeve and disposed respectively between the sleeve and headed axle end and sleeve and bearing, drive wheels rotatably disposed upon the sleeve, clutch means between each drive wheel and the sleeve for locking the former with the latter when moved in one direction, a pivoted treadle, and means connected with the treadle and with the drive wheels for imparting rotary motion to the latter.

GEORGE GRANT WHITE.

Witnesses:
E. N. ALLEN,
RAY H. WILLIAN.

Copies of this patent may be obtained for five cents each, by addressing the "Commissioner of Patents, Washington, D. C."